(12) United States Patent
Quinn et al.

(10) Patent No.: US 9,068,372 B2
(45) Date of Patent: Jun. 30, 2015

(54) SYSTEMS AND METHODS FOR CONSTRUCTING TEMPORARY, RE-LOCATABLE STRUCTURES

(71) Applicants: Insular, Corp., Arnold, MD (US); Premium Steel Building Systems, Inc., Roanoke, VA (US)

(72) Inventors: James G. Quinn, Arnold, MD (US); E. Danny Feazell, Huddleston, VA (US); Gary N. Feazell, Moneta, VA (US)

(73) Assignees: Premium Steel Building Systems, Inc., Roanoke, VA (US); Insular Corp., Arnold, MD (US)

( * ) Notice: Subject to any disclaimer, the term of this patent is extended or adjusted under 35 U.S.C. 154(b) by 0 days.

(21) Appl. No.: 13/966,483

(22) Filed: Aug. 14, 2013

(65) Prior Publication Data

US 2014/0047780 A1 Feb. 20, 2014

Related U.S. Application Data

(60) Provisional application No. 61/683,026, filed on Aug. 14, 2012.

(51) Int. Cl.
*E04H 1/02* (2006.01)
*E04B 1/74* (2006.01)
*E02D 27/00* (2006.01)
*E04B 1/343* (2006.01)

(52) U.S. Cl.
CPC .. *E04H 1/02* (2013.01); *E04B 1/74* (2013.01); *Y02B 30/94* (2013.01); *E02D 27/00* (2013.01); *E04B 1/34315* (2013.01)

(58) Field of Classification Search
CPC .................................. E04B 1/74; H04H 1/02
USPC ........................................................ 52/23, 64
See application file for complete search history.

(56) References Cited

U.S. PATENT DOCUMENTS

| 1,513,605 | A | * | 10/1924 | Kramer ........................ 220/565 |
| 2,142,305 | A | | 1/1939 | Davis |
| 3,400,958 | A | | 9/1968 | Haimes et al. |
| 3,707,811 | A | * | 1/1973 | Hampson ......................... 52/23 |
| 3,716,267 | A | * | 2/1973 | Lindsay ....................... 296/168 |
| 3,830,457 | A | * | 8/1974 | Stewart ........................ 248/499 |

(Continued)

FOREIGN PATENT DOCUMENTS

| EP | 1333129 | 8/2003 |
| GB | 2478907 | 9/2011 |

OTHER PUBLICATIONS

PCT Search Report for PCT/US2004/020989 dated Jul. 28, 2005.

(Continued)

*Primary Examiner* — Charles A Fox
*Assistant Examiner* — Joseph J Sadlon
(74) *Attorney, Agent, or Firm* — Remenick PLLC

(57) ABSTRACT

A system and method for constructing a temporary structure is disclosed. The system comprises a plurality of wall panels, a plurality of roof panels, a plurality of floor panels, at least one foundation panel, at least one sub-floor truss supporting the plurality of floor panels and placed atop the at least one foundation panel, at least one sub-roof truss supporting the plurality of roof panels, and at least one floor coupling bracket, each floor coupling bracket coupling one wall panel, one floor panel, one sub-floor truss, and one foundation panel.

20 Claims, 25 Drawing Sheets

(56) References Cited

U.S. PATENT DOCUMENTS

| | | | |
|---|---|---|---|
| 3,992,839 A | 11/1976 | La Borde | |
| 4,284,447 A | 8/1981 | Dickens et al. | |
| 4,288,951 A | 9/1981 | Carlson et al. | |
| 4,404,889 A | 9/1983 | Miguel | |
| 4,435,939 A | 3/1984 | Hird | |
| 4,458,462 A | 7/1984 | Schold | |
| 4,464,877 A * | 8/1984 | Gebhardt et al. | 52/745.02 |
| 4,534,141 A | 8/1985 | Fagnoni | |
| 4,780,039 A | 10/1988 | Hartman | |
| 4,822,657 A | 4/1989 | Simpson | |
| 4,843,793 A * | 7/1989 | Ayers | 52/169.12 |
| 4,953,334 A | 9/1990 | Dickens | |
| 5,014,478 A | 5/1991 | Spring | |
| 5,060,582 A | 10/1991 | Salzer | |
| 5,083,410 A | 1/1992 | Watson | |
| 5,165,816 A | 11/1992 | Parasin | |
| 5,185,195 A | 2/1993 | Harpell et al. | |
| 5,257,583 A | 11/1993 | Koenig | |
| 5,370,034 A | 12/1994 | Turner et al. | |
| 5,469,796 A | 11/1995 | Koenig | |
| 5,502,939 A | 4/1996 | Zadok et al. | |
| 5,579,794 A * | 12/1996 | Sporta | 135/88.01 |
| 5,596,844 A | 1/1997 | Kalinowski | |
| 5,701,715 A * | 12/1997 | Masters et al. | 52/698 |
| 5,724,782 A | 3/1998 | Rice et al. | |
| 5,758,461 A | 6/1998 | McManus | |
| 5,767,435 A | 6/1998 | Reymann | |
| 5,799,462 A | 9/1998 | McKinney | |
| 5,966,956 A | 10/1999 | Morris et al. | |
| 5,970,675 A | 10/1999 | Schray | |
| 6,035,584 A | 3/2000 | Barreto | |
| 6,082,240 A | 7/2000 | Middione et al. | |
| 6,253,498 B1 | 7/2001 | Fanucci | |
| 6,339,905 B1 | 1/2002 | Craig | |
| 6,408,594 B1 | 6/2002 | Porter | |
| 6,415,571 B2 * | 7/2002 | Risser | 52/302.1 |
| 6,532,857 B1 | 3/2003 | Shih et al. | |
| 6,647,689 B2 | 11/2003 | Pletzer et al. | |
| 6,826,996 B2 | 12/2004 | Strait | |
| 6,945,064 B2 | 9/2005 | Jebaraj | |
| 7,086,209 B1 | 8/2006 | Pruitt et al. | |
| 7,117,645 B2 | 10/2006 | Bzorgi | |
| 7,412,805 B2 * | 8/2008 | Parrish | 52/293.3 |
| 7,520,205 B1 | 4/2009 | Colliflower et al. | |
| 7,654,042 B1 * | 2/2010 | Brown | 52/23 |
| 7,818,939 B2 | 10/2010 | Bearinger et al. | |
| 7,823,364 B2 * | 11/2010 | Elliott | 52/745.05 |
| 7,882,659 B2 | 2/2011 | Gyory et al. | |
| 7,905,067 B2 * | 3/2011 | Schiffmann et al. | 52/293.3 |
| 7,966,775 B2 | 6/2011 | Medley | |
| 8,136,303 B2 | 3/2012 | Scott, IV | |
| 8,146,314 B2 * | 4/2012 | Nguyen | 52/478 |
| 8,156,690 B2 | 4/2012 | Higley | |
| 2004/0020989 A1 | 2/2004 | Muramatsu | |
| 2004/0052999 A1 | 3/2004 | Rogers | |
| 2005/0063780 A1 | 3/2005 | Thorne | |
| 2006/0117689 A1 | 6/2006 | Onken et al. | |
| 2007/0039262 A1 | 2/2007 | Forgy | |
| 2007/0144090 A1 | 6/2007 | Nguyen | |
| 2008/0083180 A1 | 4/2008 | Miller | |
| 2009/0188181 A1 | 7/2009 | Forbis et al. | |
| 2009/0223144 A1 | 9/2009 | Leahy | |
| 2009/0272060 A1 | 11/2009 | Lucchesi | |
| 2010/0005749 A1 * | 1/2010 | Abdel-Sayed et al. | 52/650.2 |
| 2010/0154331 A1 | 6/2010 | Dickens | |
| 2010/0319285 A1 | 12/2010 | Jewett et al. | |
| 2010/0325971 A1 | 12/2010 | Leahy | |
| 2010/0325989 A1 | 12/2010 | Leahy | |
| 2011/0000014 A1 | 1/2011 | Ball et al. | |
| 2011/0047912 A1 | 3/2011 | Armijo | |
| 2011/0132421 A1 | 6/2011 | Dolsby et al. | |
| 2011/0154761 A1 | 6/2011 | Quinn | |
| 2011/0179745 A1 | 7/2011 | Herron | |

OTHER PUBLICATIONS

PCT Patentabilty Report for PCT/US2004/020989 dated Jul. 28, 2005.

PCT Patentabilty Report for PCT/US2012/039683 dated Nov. 26, 2013.

PCT Search Report for PCT/US2013/054843, dated Feb. 5, 2014.

* cited by examiner

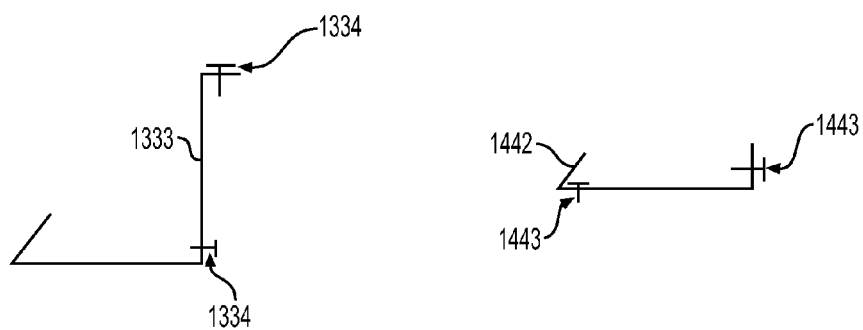
FIG. 13A          FIG. 14A
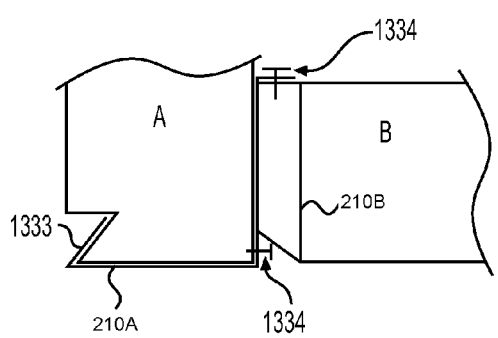   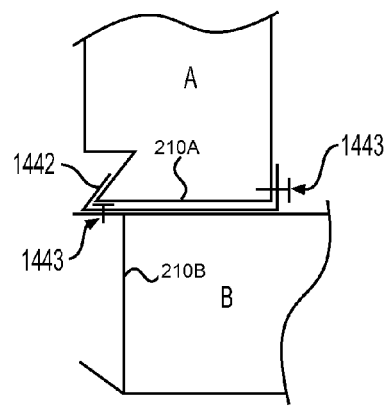
FIG. 13B          FIG. 14B

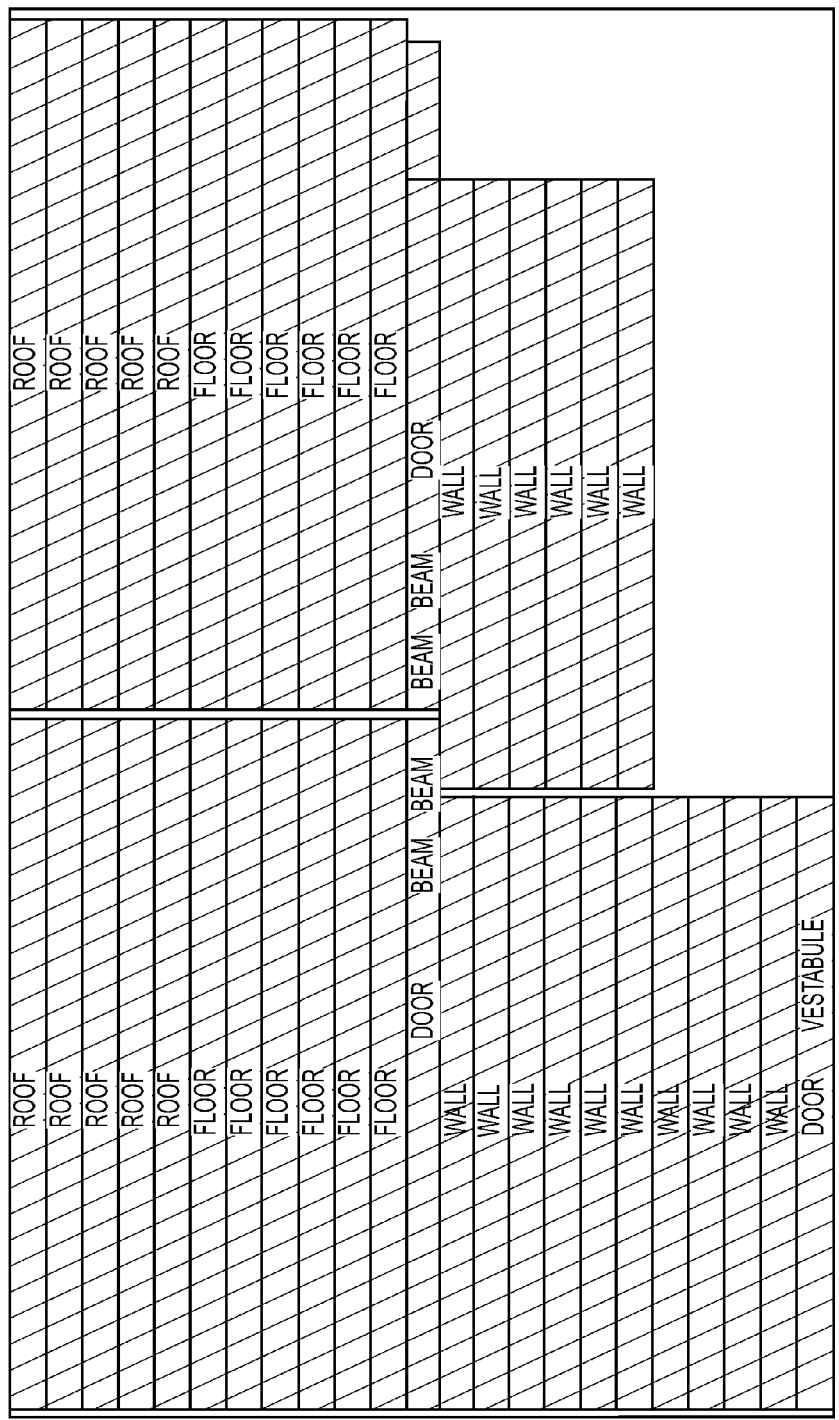
TOP VIEW  *FIG. 15B*

FLOOR PANEL LAYOUT

ROOF PANEL LAYOUT

FOUNDATION PANEL LAYOUT FIG. 23

| 10 | 10 | 10 | 10 | 10 |
|---|---|---|---|---|
| 10 | 10 | 10 | 10 | 10 |
| 10 | 10 | 10 | 10 | 10 |
| 10 | 10 | 10 | 10 | 10 |
| 10 | 10 | 10 | 10 | 10 |
| 10 | 10 | 10 | 10 | 10 |

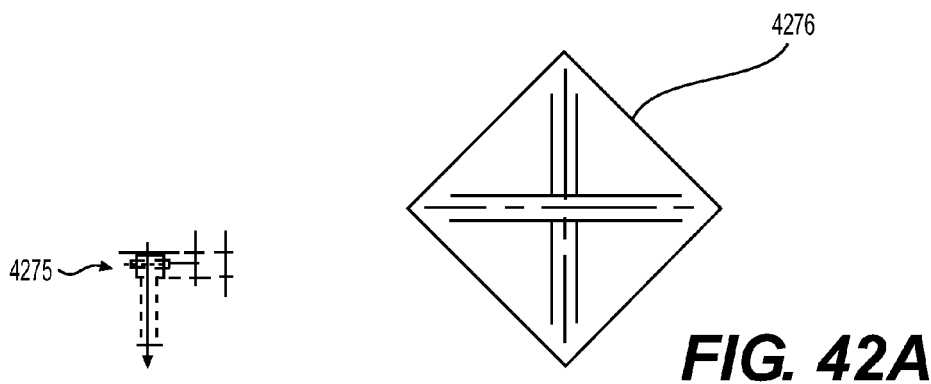
FIG. 42C
FIG. 42A
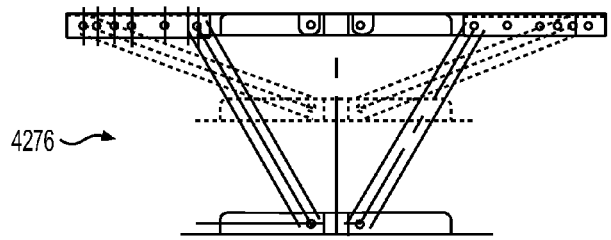
ADJUSTABLE STRUCTURE SUPPORT
FIG. 42B

SYSTEMS AND METHODS FOR CONSTRUCTING TEMPORARY, RE-LOCATABLE STRUCTURES

REFERENCE TO RELATED APPLICATIONS

This application claims priority to U.S. Provisional Application Ser. No. 61/683,026, filed Aug. 14, 2012, and entitled "Systems and Methods for Constructing Temporary, Re-locatable Structures," which is hereby specifically and entirely incorporated by reference.

BACKGROUND

1. Field of the Invention

The invention is directed to systems and methods of constructing temporary or re-locatable structures and, in particular, systems and methods of constructing temporary structures to be energy efficient using insulated panels.

2. Background of the Invention

Global warming, high energy costs, lack of reusable sources of energy, and diminishing resources of fossil fuels are all reasons, among others, to improve the energy efficiency of structures. Traditional temporary structures, such as tents, collapsible fabric or metal structures, or plastic structures, are usually energy inefficient, losing hot and/or cool air though the various surfaces, walls, roofs, windows, doors, gaps, and other components.

In order to improve the energy efficiency of these temporary buildings it is often necessary to retrofit the building with energy efficient materials, for example with spray-on insulation. Such upgrading is costly, time consuming, and can ruin the structure or prevent it from being re-locatable. Furthermore, existing temporary structures often are difficult to assemble, having multiple parts that must be sorted, organized and installed.

Therefore, it is desirable to have systems and methods of constructing a temporary structure that is cost effective, easy to install, and provides energy efficiency.

SUMMARY OF THE INVENTION

The present invention overcomes the problems and disadvantages associated with current strategies and designs and provides new systems and methods of constructing temporary or re-locatable structures.

One embodiment of the invention is directed to a system for constructing a temporary structure. The system comprises a plurality of wall panels, a plurality of roof panels, a plurality of floor panels, at least one adjustable support structure, at least one sub-floor truss supporting the plurality of floor panels and placed atop the at least one adjustable support structure, at least one sub-roof truss supporting the plurality of roof panels, and at least one floor coupling bracket, each floor coupling bracket coupling one wall panel, one floor panel, and one sub-floor truss.

Preferably, the system further comprises at least one tie-down coupled to the structure. In a preferred embodiment, the wall panels, the roof panels, and the floor panels are identical. The system preferably further comprises a coating on the surface of at least one panel. Preferably, the system is adapted to be assembled and disassembled into the original components on location. Preferably, the system is adapted to be re-located and reassembled after being disassembled.

In a preferred embodiment, the system further comprises at least one of screws, adhesive, rivets, bolts, or nails to adjoin panels. Preferably, the structure is a multi-story structure. Preferably, the roof panels of the first story are the floor panels of the second story. In a preferred embodiment, the system further comprises level coupling brackets coupling a lower level to an upper level.

Preferably, each panel is insulated and fire retardant. Preferably there is at least one entranceway panel. In a preferred embodiment, the system preferably further comprises interior wall panels, wherein the interior wall panels divide the structure into a plurality of rooms. Preferably, each panel is reinforced with at least one steel stud. Preferably, adjacent panels are coupled together with shiplap joints. Preferably, the system further comprises a foundation panel below the at least one floor truss.

Preferably, the entire system is arrangeable within a single shipping container. Preferably, the system further comprises at least one support panel or at least one skirt panel coupled to the at least one floor truss and below the plurality of floor panels. Preferably, at least a portion of the panels are pre-drilled to accept a screw. Preferably, multiple structures are arranged side-by-side to create a larger structure.

Other embodiments and advantages of the invention are set forth in part in the description, which follows, and in part, may be obvious from this description, or may be learned from the practice of the invention.

DESCRIPTION OF THE DRAWINGS

The invention is described in greater detail by way of example only and with reference to the attached drawings, in which:

FIGS. 13A-B depict an embodiment of coupling a wall panel to a floor panel.
FIGS. 14A-B depict an embodiment of coupling a wall panel to a floor panel.
FIGS. 15A-B depict an embodiment of the elements of an exemplary structure contained within a standard shipping container.
FIGS. 17-30 depict different views of an embodiment of a one story relocatable structure.

FIGS. 42A-C depict an embodiment of an adjustable structure support.

DESCRIPTION OF THE INVENTION

As embodied and broadly described herein, the disclosures herein provide detailed embodiments of the invention. However, the disclosed embodiments are merely exemplary of the invention that may be embodied in various and alternative forms. Therefore, there is no intent that specific structural and functional details should be limiting, but rather the intention is that they provide a basis for the claims and as a representative basis for teaching one skilled in the art to variously employ the present invention.

A problem in the art capable of being solved by the embodiments of the present invention is constructing a temporary, re-locatable structure that is energy efficient. It has been surprisingly discovered that by using interlocking brackets and insulating panels an energy efficient temporary structure can be constructed more easily and quickly than a traditional temporary structure.

Figure 1A:
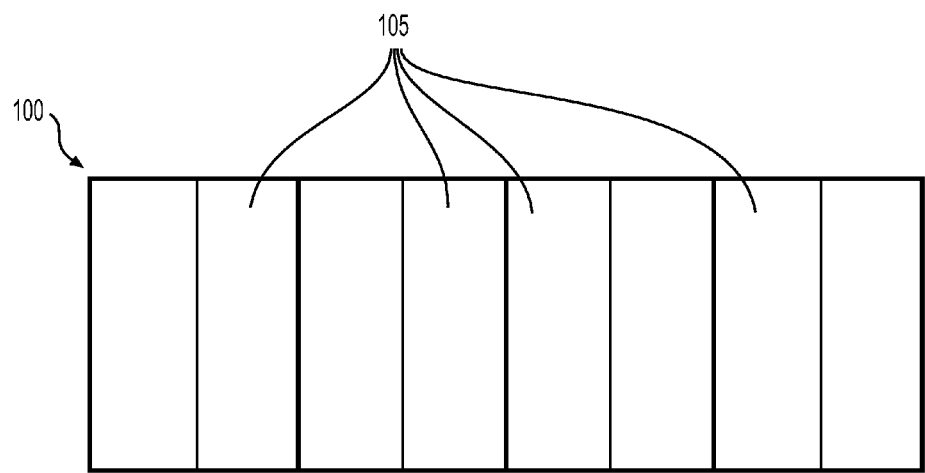
FIG. 1A depicts an embodiment of a wall of side panels.
Figure 1B:
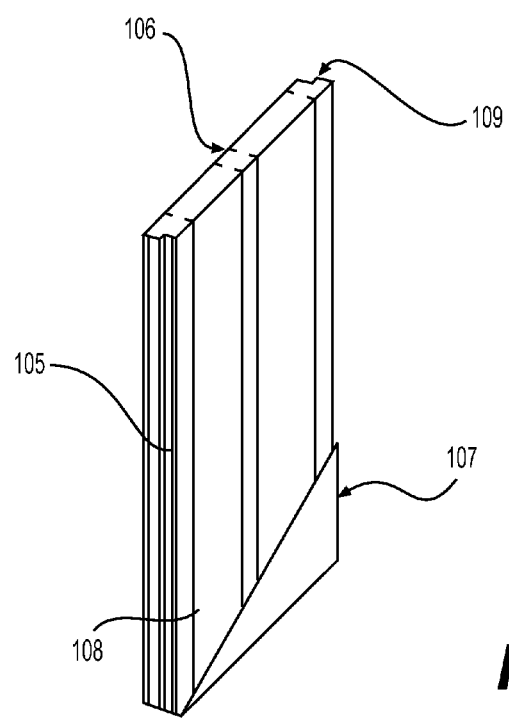
FIG. 1B depicts a perspective view of a wall panel.

FIG. 1A depicts an exemplary exterior wall 100. In the preferred embodiment, wall 100 is comprised of a plurality of panels 105. FIG. 1B depicts a perspective view of an embodiment of a wall panel 105. As shown in FIGS. 1A-B, panels 105 are 8 feet wide by 8.5 feet tall; however other size panels can be used. Preferably each panel 105 is comprised of a polystyrene (e.g. Neopor or Styropor) core; however, other insulating materials such as, but not limited to, fiberglass, urea-formaldehyde, cellulous, and polyethylene can be used. The thickness and foam density may vary due to specific requirements. wall panel 105 may further include varying gauge steel studs 109 Additionally, panels 105 may be coated with FRP (fiberglass reinforced plastic) boards, film coverings (e.g. graphical image film coverings or heat dissipating film coverings), spray coatings (e.g. insulating spray coatings or fire retardant spray coatings), Strongwell's Safe Plates, or other materials. Panels 105 are preferably also made of a fire retardant material, such as fireboard 108. Preferably, panels 105 have a thickness of either 3.5 inches, 5.5 inches, or 7.5 inches; however other thicknesses are possible. Each panel 105 may additionally have one or more steel studs formed therein. The steel studs can be of varying gauge, depending on the use of the panel. In the preferred embodiment, panels 105 weigh no more than 1.625 pounds per square foot; however other weights are possible. In a preferred embodiment, there is an exterior steel skin with a PVC coating 106 and an interior steel skin with a PVC coating 107.

Figure 2:
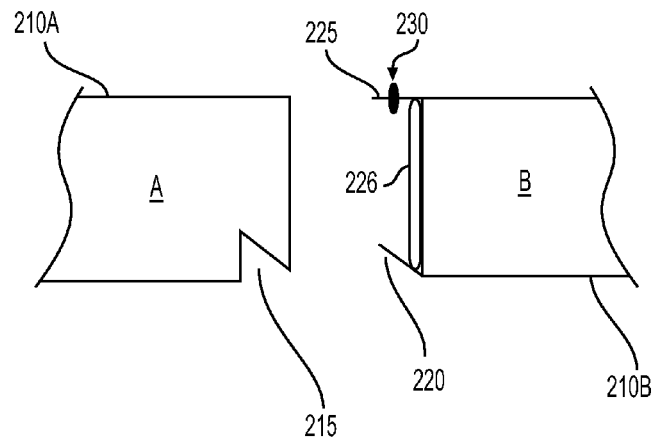
FIG. 2 depicts an embodiment of interlocking tracks.

FIG. 2 depicts exemplary interlocking tracks 210A (labeled A in the figures) and 210B (labeled B in the figures). In the preferred embodiment, each panel 105 has one track 210A coupled to a first edge and one track 210B coupled to a second, parallel edge. In the preferred embodiment, tracks 210A and 210B are coupled to the long sides of panels 105, however, depending on the structure, the short sides of panels 105 can be coupled to tracks 210A and 210B. Furthermore, in certain embodiments each panel can have two tracks 210A and two tracks 210B. Preferably in embodiments with tracks on each edge of the panel 105, the two tracks 210A are adjacent to each other and the two tracks 210B are adjacent to each other such that opposing edges have different tracks.

Track 210A has indented or recessed portion 215 along its outer edge, into which angled hemmed tab 220 of track 210B mates. On the opposite edge of track 210B from angled hemmed tab 220 is straight hemmed tab 225. As can be seen from FIG. 2, both angled and straight hemmed tabs 220 and 225 extend from the outer edge of track 210B. In a preferred embodiment a foam seal 226 or other insulation is placed between track 210A and track 210B as they are coupled. Furthermore, in a preferred embodiment, a fastener 230 (for example, a turn polycarbonate fastener, a rivet, a bolt, a screw, a brad, glue, adhesive, double-stick tape, or another fastener) is used to secure track 210A to track 210B once the two tracks are coupled together. Both tracks 210A and 210B are preferably made of 20 or 24 gage steel, however other materials can be used.

Figure 3:
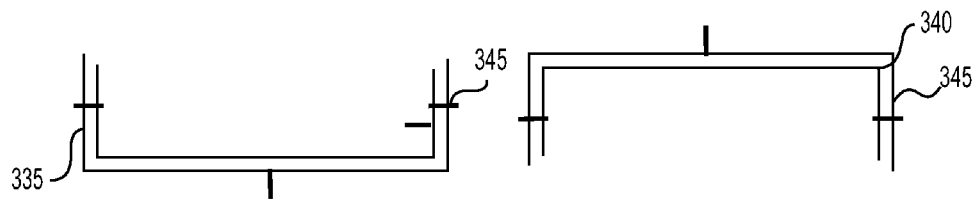
FIG. 3 depicts an embodiment of top and bottom tracks.

FIG. 3 depicts an embodiment of bottom tracks 335 and top tracks 340. In a preferred embodiment, bottom track 340 is coupled to the bottom edge of each panel 105 and top track 340 is coupled to the top edge of each panel 105. Preferably, both bottom track 335 and top track 340 are "C" shaped double tracks. Bottom track 335 and top track 340 preferably couple to panel 105 with fasteners 345 (for example, a turn polycarbonate fastener, a rivet, a bolt, a screw, a brad, glue, adhesive, double-stick tape, or another fastener). Bottom track 335 and top track 340 preferably also couple to the floor and roof with fasteners.

Figure 4:
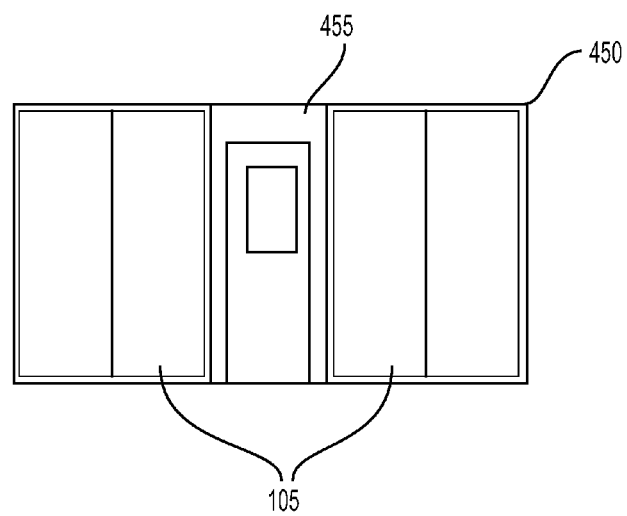
FIG. 4 depicts another embodiment of a wall of side panels.

FIG. 4 depicts another embodiment of an exterior wall 450. The exterior wall for example may be comprised of two panels 105 and entrance 455. Another number of panels 105 and entrances 455 can be used in any order. Entrance 455 is preferably made of the same material as panels 105, however, entrance 455 also includes a door or other entranceway. In FIG. 4, entrance 455 is shown as 4 feet wide by 8.5 feet tall, however another size panel can be used. Preferably, entrance 455 has the same height as panels 105.

Figure 5:
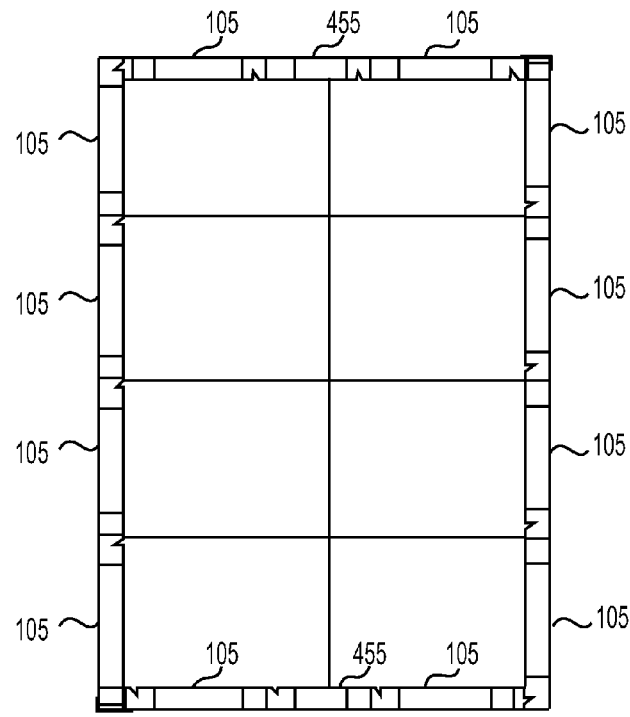
FIG. 5 depicts a plan for an embodiment of a temporary structure.

FIG. 5 depicts an example of a temporary structure floor plan. As can be seen in the figure, the floor plan is a rectangular structure having two parallel long walls made up of four panels 105 each and two parallel short walls made up of two panels 105 and one entrance 455 each. The configuration shown in FIG. 5 is merely exemplary and another number of panels 105 and entrances 455 can be used to define the structure. Additionally, structures can be assembled in multiples or stacked as needed. Furthermore, structures need not be rectangular, but can have another shape.

Figure 6:
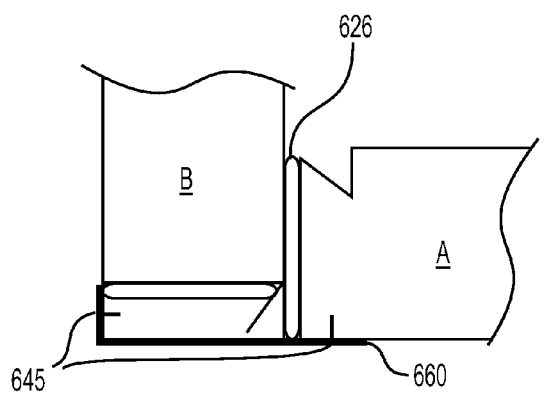
FIG. 6 depicts an embodiment of coupling perpendicular side panels.

FIG. 6 depicts the self-locking corner 660 used to couple perpendicular sections of wall. Self-locking corner 660 is preferably used to couple a track 210b of a first panel 105 to a track 210A of a second, perpendicular panel 105. Self-locking corner 660 is preferably coupled to tracks 210A and 210B with a fastener 645 (for example, a turn polycarbonate fastener, a rivet, a bolt, a screw, a brad, glue, adhesive, double-stick tape, or another fastener). A foam seal 626 or other insulation can be used between tracks 210A and 210B to improve the insulation of the structure.

Figure 7:
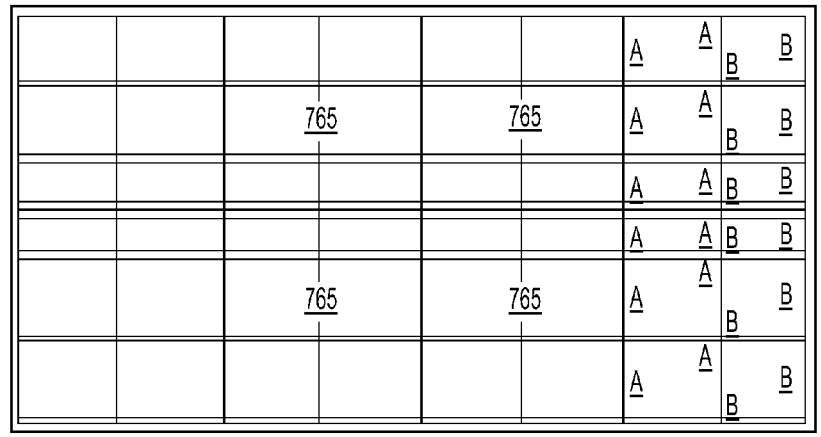
FIG. 7 depicts an embodiment of roof and floor panels.

FIG. 7 depicts roof and floor panels 765. Preferably roof and floor panels 765 are made of the same materials as panels 105. As shown in FIG. 7, roof and floor panels 765 are preferably 8 feet by 10 feet, however other dimensions can be used. In the preferred embodiment, each roof and floor panel 765 is coupled on two sides with track 210A and on two sides with track 210B, however other configurations can be utilized. Preferably, the roof is supported by beams. The beams preferably span the 20 foot section of the structure and are placed at 4 foot or 8 foot intervals, however other distributions and sizes of the beams can be used.

Figure 8:
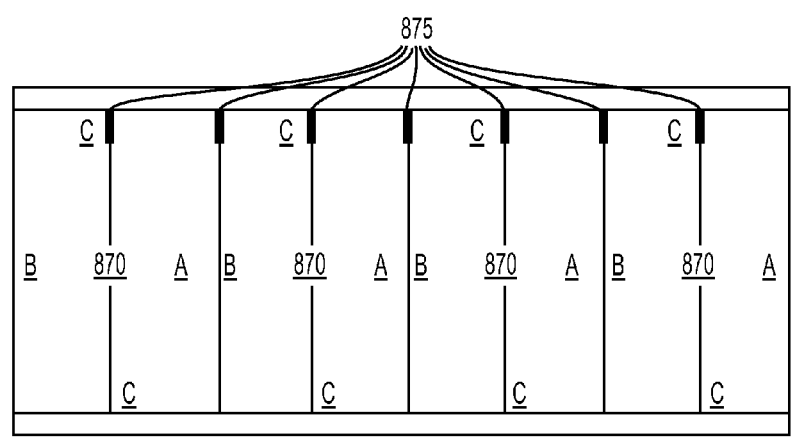
FIG. 8 depicts an embodiment of an exterior wall.

FIG. 8 depicts exterior wall sections 870 with cross beam roof supports at intervals. Exterior wall sections 870 are the same as panels 105, except exterior wall section 870 are able to be coupled to roof beams 875. In the preferred embodiment, wall sections 870 are installed down both sides of the temporary structure. Numerous configurations can be implemented to divide the structure into rooms by using panels such as section 870. Additional temporary structures can be coupled to the first temporary structure to create longer, wider, or stacked (e.g. two story) structures. The additional temporary structures can be coupled to the first temporary structure either side by side, end to end, or one on top of another.

Figure 9A:
FIGS. 9A-B depict an embodiment of coupling a wall panel to a floor panel.
Figure 9B:
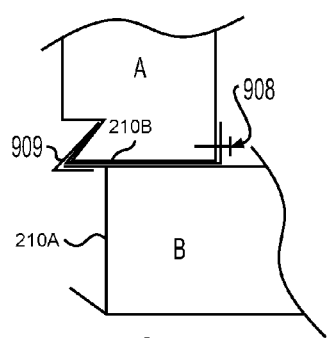

FIGS. 9A-B depict an embodiment of a coupling device 909 for coupling a wall panel coupled to track 210A to a floor panel coupled to track 210B. Coupling device 909 is substantially "C" shaped. As can be seen in FIG. 9B, the upper portion of coupling device 909 mates with track 210A and there is a flange that couples to straight hemmed tab 225 of track 210B. Coupling device 909 is preferably made of 20 or 24 gage steel, however other materials can be used. In the preferred embodiment a fastener 908 engages coupling device 909 and track 210A securely coupling the wall panel to the floor panel. Fastener 908 can be a turn polycarbonate fastener, a rivet, a bolt, a screw, a brad, glue, adhesive, double-stick tape, or another fastener.

Figure 10A:
FIGS. 10A-B depict an embodiment of coupling a wall panel to a roof panel.
Figure 10B:
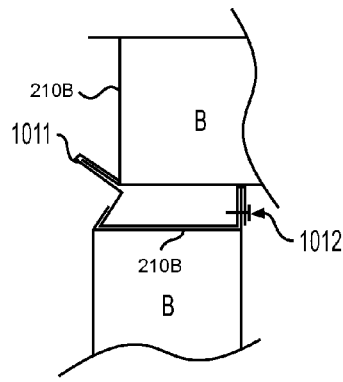

FIGS. 10A-B depict an embodiment of a coupling device 1011 for coupling a wall panel coupled to track 210B to a roof panel coupled to track 210B. Coupling device 1011 is substantially "C" shaped. As can be seen in FIG. 10B, the upper portion of coupling device 1011 has a flange that mates with the angled hemmed tab of the track 210B of the roof panel while the lower portion of coupling device 1011 mates with track 210B of the wall panel. Coupling device 1011 is preferably made of 20 or 24 gage steel, however other materials can be used. In the preferred embodiment a fastener 1012 engages coupling device 1011 and track 210B of the wall panel securely coupling the wall panel to the roof panel. Fastener 1012 can be a turn polycarbonate fastener, a rivet, a bolt, a screw, a brad, glue, adhesive, double-stick tape, or another fastener.

Figure 11A:
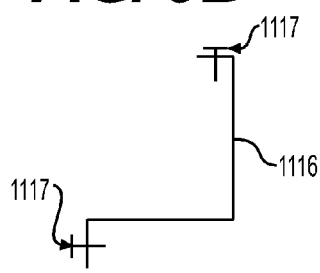
FIGS. 11A-B depict an embodiment of coupling a wall panel to a roof panel.
Figure 11B:
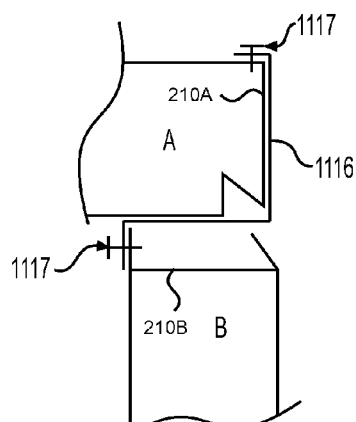

FIGS. 11A-B depict an embodiment of a coupling device 1116 for coupling a wall panel coupled to track 210B to a roof panel coupled to track 210A. Coupling device 1116 is substantially "C" shaped. As can be seen in FIG. 11B, the upper portion of coupling device 1116 surrounds track 210A of the roof panel, while the lower portion of coupling device 1116 abuts with track 210B of the wall panel. Coupling device 1116 is preferably made of 20 or 24 gage steel, however other materials can be used. In the preferred embodiment fasteners 1117 engage coupling device 1116 and both track 210B of the wall panel and track 210A of the roof panel, securely coupling the wall panel to the roof panel. Fasteners 1117 can be a turn polycarbonate fastener, a rivet, a bolt, a screw, a brad, glue, adhesive, double-stick tape, or another fastener.

Figure 12A:
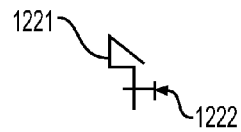
FIGS. 12A-B depict an embodiment of coupling two roof panels and a roof beam.
Figure 12B:
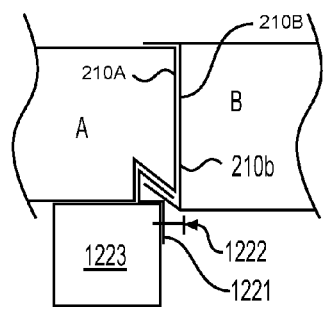

FIGS. 12A-B depict an embodiment of a coupling device 1221 for coupling two roof panels to a beam 1223. Coupling device 1221 is substantially "A" shaped. As can be seen in FIG. 12B, the upper portion of coupling device 1221 fits within the indented portion 215 of track 210A and over angled hemmed tab 220 of track 210B, while the lower portion abuts beam 1223. Coupling device 1221 is preferably made of 20 or 24 gage steel, however other materials can be used. In the preferred embodiment a fastener 1222 engages coupling device 1221 and beam 1223, securely coupling the roof panels to the beam 1223. Fastener 1222 can be a turn polycarbonate fastener, a rivet, a bolt, a screw, a brad, glue, adhesive, double-stick tape, or another fastener.

FIGS. 13A-B depict an embodiment of a coupling device 1333 for coupling two perpendicular wall panels at a corner. Coupling device 1333 is substantially "C" shaped. As can be seen in FIG. 13B, the left portion of coupling device 1333 mates with track 210A of a first wall panel, while the right portion of coupling device 1333 abuts track 210B of the second wall panel. Coupling device 1333 is preferably made of 20 or 24 gage steel, however other materials can be used. In the preferred embodiment fasteners 1334 engage coupling device 1333 and both track 210A of the first wall panel and track 210B of the second wall panel, securely coupling the wall panels. Fasteners 1334 can be a turn polycarbonate fastener, a rivet, a bolt, a screw, a brad, glue, adhesive, double-stick tape, or another fastener.

FIGS. 14A-B depict an embodiment of a coupling device 1442 for coupling two perpendicular wall panels at a corner. Coupling device 1442 is substantially "C" shaped. As can be seen in FIG. 14B, the upper portion of coupling device 1442 mates with track 210A of a first wall panel, while the lower portion of coupling device 1442 abuts track 210B of the second wall panel. Coupling device 1442 is preferably made of 20 or 24 gage steel, however other materials can be used. In the preferred embodiment fasteners 1443 engage coupling device 1442 and both track 210A of the first wall panel and track 210B of the second wall panel, securely coupling the wall panels. Fasteners 1443 can be a turn polycarbonate fastener, a rivet, a bolt, a screw, a brad, glue, adhesive, double-stick tape, or another fastener.

In the preferred embodiment, each of the components of the temporary structure is manufactured off-site, and then the components are delivered to the site of the temporary structure where they are assembled. Preferably, the temporary structure can be assembled and disassembled with minimum effort and tools. Furthermore, the components can be reused so that the structure is re-locatable. Preferably, during assembly, each fastener is installed either from the inside of the structure or from the roof of the structure.

Figure 15A:
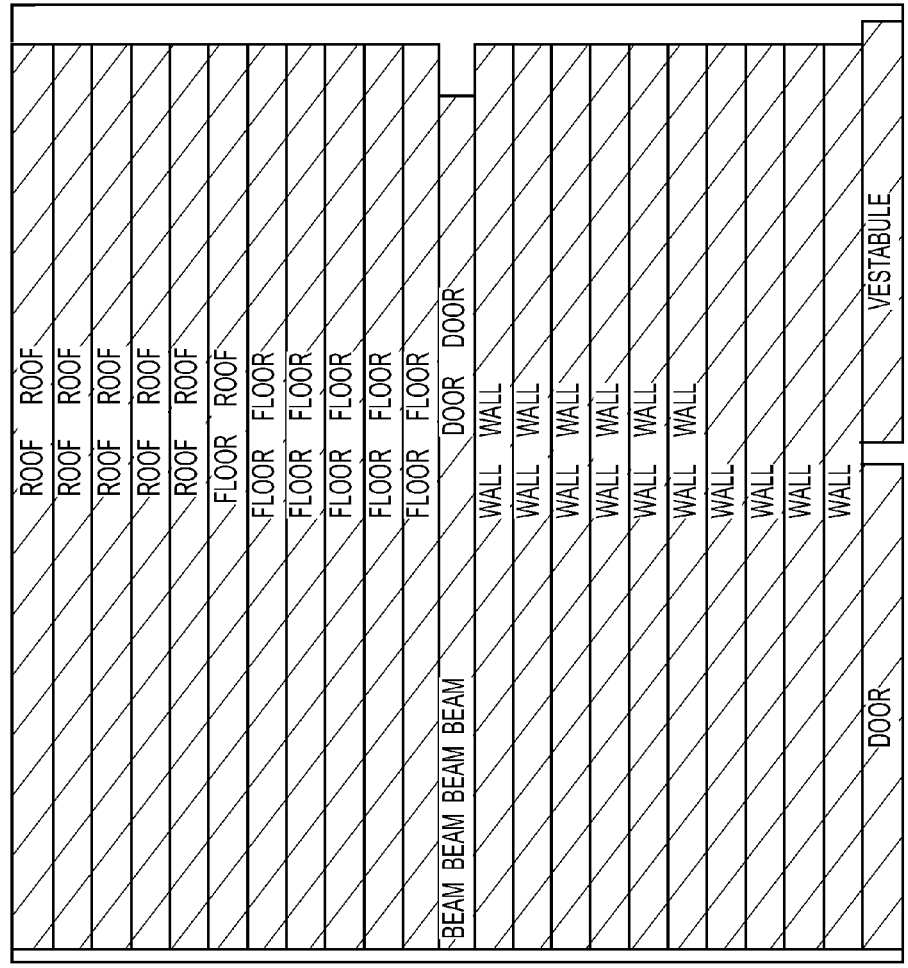

FIGS. 15A-B depict all of the components for an approximately 20'×40' temporary structure fit within a standard 20 foot shipping container for transportation. The arrangement of the components as shown in FIGS. 15A-B is merely one possible configuration. Different configurations can be implemented for different projects and different selections of components. In locations where wind is an issue, traditional anchors and tie downs can be used to secure the temporary structure. In the preferred embodiment, the roof can support at least a 40 lb load, however in other embodiment embodiments the roof can support greater loads.

Figure 16:
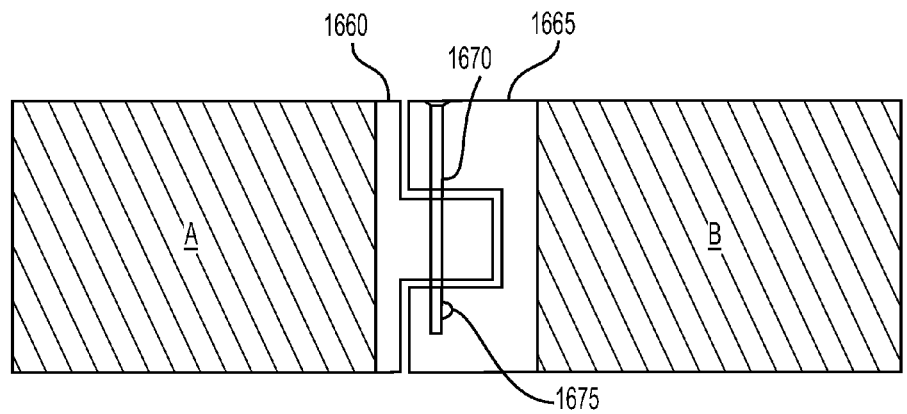
FIG. 16 depicts another embodiment of a panel coupling.

FIG. 16 depicts another embodiment of a coupling between two adjacent wall panels. The coupling depicted in FIG. 16 is a tongue and groove system. As shown, panel A is coupled to a tongue connector 1660, while panel B is coupled to a groove connector 1665. While one tongue connector 1660 and one groove connector 1665 is shown, another number of tongues and grooves can be implemented. In the preferred embodiment, tongue connector 1660 and groove connector 1665 are both made of the same material. For example, both connectors can be metal, plastic, wood, fiberglass, concrete, or another naturally occurring or manmade material. Each panel preferably has two edges that have tongue connectors and two edges that have groove connectors, however other configurations are possible.

In the preferred embodiment, both tongue connector 1660 and groove connector 1665 are hollow, thereby providing an open space between the connectors and the ends of panel A and B. In a preferred embodiment, an insulating material is placed between tongue connector 1660 and groove connector 1665 during assembly. The insulating material can be foam, fabric, fiberglass, or another insulating material. In a preferred embodiment, one or more of panel A and panel B may have an alignment pin to facilitate coupling tongue connector 1660 and groove connector 1665 during assembly.

Preferably, a locking pin 1670 is placed through both tongue connector 1660 and groove connector 1665, as shown in FIG. 16. Locking pin 1670 preferably is inserted into a predrilled hole in both connectors after they are coupled together. Locking pin 1670 is preferably countersunk so the head of locking pin 1670 does not extend beyond the surface of either panel A or B. Locking pin 1670 may have a cam 1675 that extends from the body of locking pin 1670. Preferably cam 1675 is biased away from the center of locking pin 1670 with a spring. Cam 1675 preferably prevents locking pin 1670 from accidently coming out. However, cam 1675 allows locking pin 1670 to come out to disassemble panels A and B. Locking pin 1670 is preferably a metal rod about the size of a standard nail.

Figure 17:
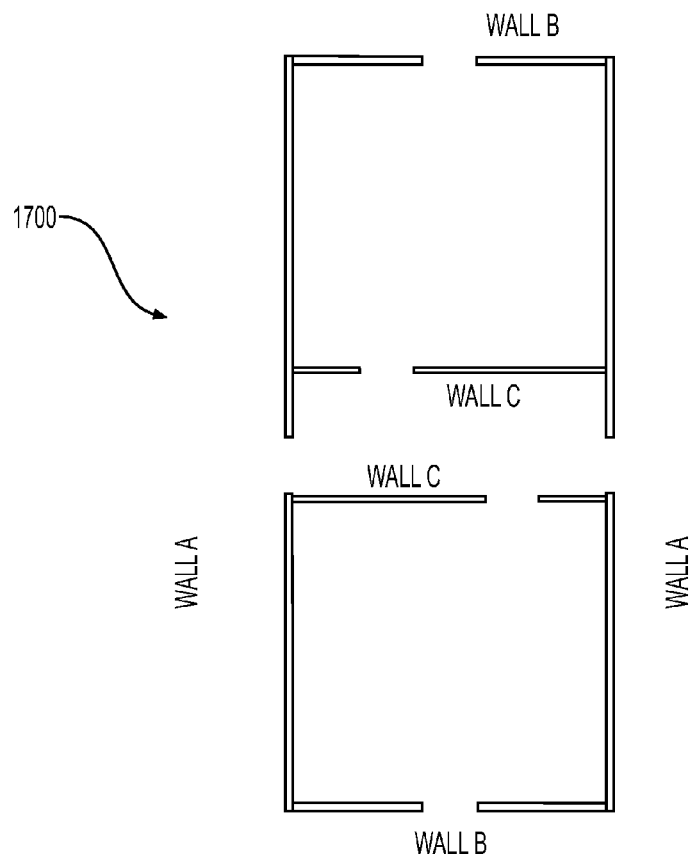

FIGS. 17-30 display different views of an embodiment of a one story relocatable structure 1700. FIG. 17 displays a general floor plan of an embodiment of the one story relocatable structure 1700. In structure 1700 the floor plan is divided into two rooms with a central vestibule. While two rooms are shown, another number of rooms can be set up (e.g. one room, three rooms, or four rooms). Additionally, structure 1700 may not have a vestibule or may have multiple vestibules. Structure 1700 is comprised of two long outer walls A, two short outer walls B, and two interior walls C. While structure 1700 is depicted as a rectangular structure, structure 1700 can have another shape, including but not limited to square, round, or triangular.

Figure 18A:
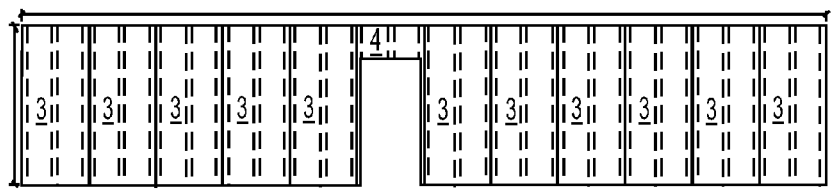
Figure 18B:

FIGS. 18A-B depict an embodiment of long outer wall A. In the preferred embodiment, wall A is comprised of a plurality of wall panels, as described herein, and an entrance way. Depending on the length of wall A, a different number of wall panels can be installed. Wall A can also have more than one entrance way or no entrances. Additionally, the entrance way can have a different placement. Preferably, the entrance ways are identical to the wall panels with a hole cut out for a door or other method of entering and exiting structure 1700.

Figure 19A:
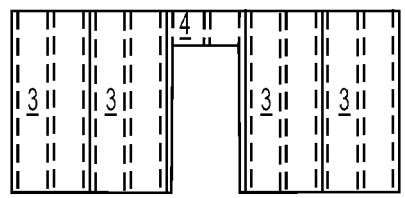
Figure 19B:
Figure 20A:
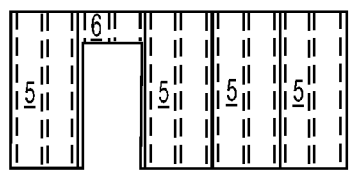
Figure 20B:

FIGS. 19A-B depict an embodiment of a short outer wall B while FIGS. 20A-B depict an embodiment of an interior wall C. In the preferred embodiment wall B is similar to wall C. For example, walls B and C have the same dimensions and both use the same panels. However, in the embodiment shown, the entrance ways of walls B and C are located at different positions. In other embodiments, walls B and/or C can have more than one entrance ways or no entrances. Depending on the length of walls B and C, a different number of wall panels can be installed.

Figures 21, 22:
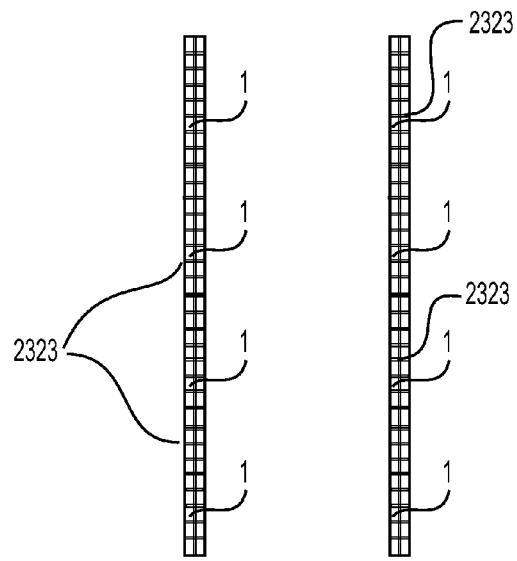

FIGS. 21 and 22 depict embodiments of floor and roof layouts for structure 1700. In the preferred embodiment, both the floor and roof layouts are identical. Each uses panels as described herein. The number of panels used and the orientation of the panels may differ depending on the dimensions of structure 1700. In a preferred embodiment, each panel may have pre-drilled holes to facilitate installation of the panels.

FIG. 23 depicts an embodiment of foundation panels 2323 to support structure 1700. Foundation panels 2323 are preferably steel however, other high straight low weight materials can be used. In the preferred embodiment, foundation panels 2323 run along two parallel sides of structure 1700. However in other embodiments foundation panels 2323 can be installed under more than two sides and/or in central positions. In the preferred embodiment, foundation panels 2323 sit on top of the underlying ground and are not buried. However, in other embodiments foundation 2323 panels can be at least partially buried.

Figure 24:
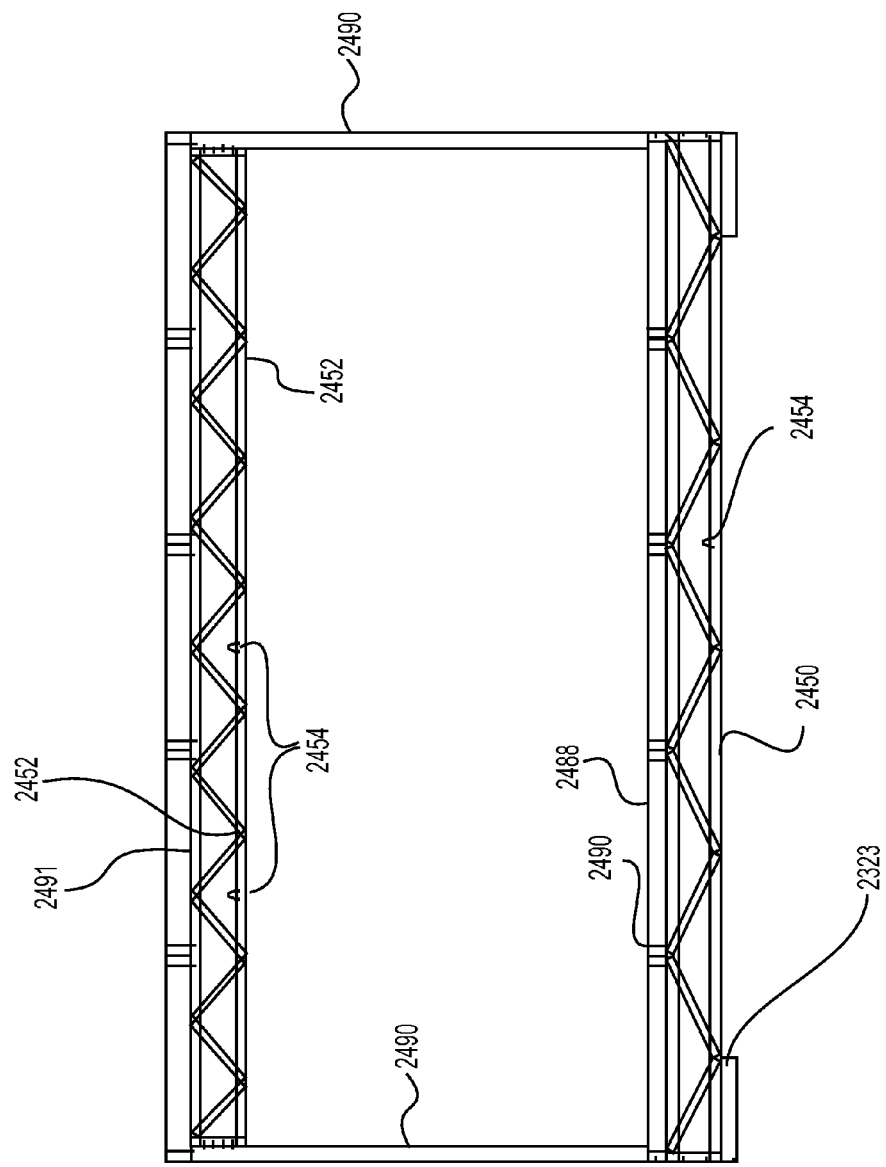
Figure 29:
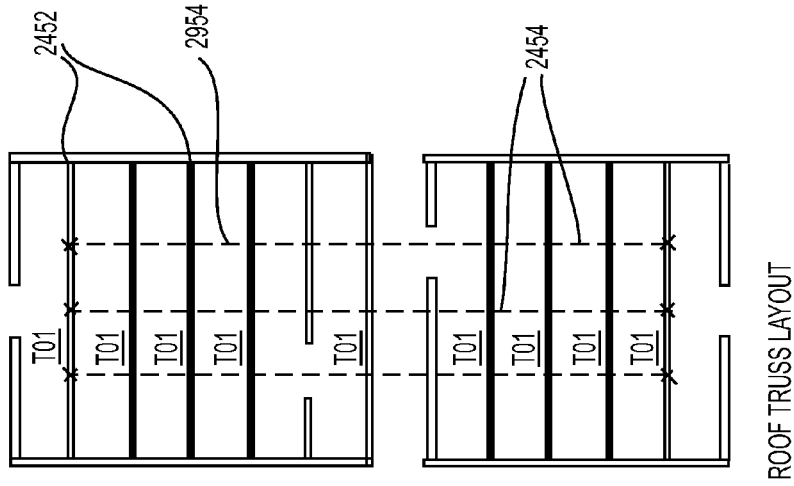
Figure 28:
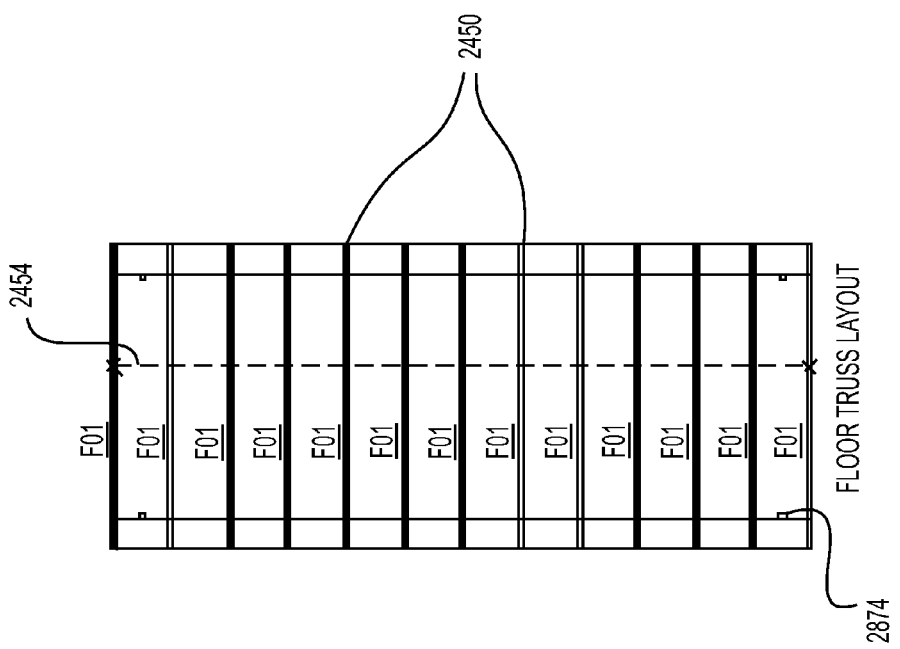

FIG. 24 depicts an embodiment of the structural trusses supporting structure 1700. Preferably, there is at least one sub-floor truss 2450 and at least one sub-roof truss 2452. Sub-floor truss 2450 is placed atop foundation panels 2323 and the floor panels 2488 are placed atop sub-floor truss 2450. In the preferred embodiment, the floor panels 2488 are secured to sub-floor truss 2450 by screws, however other fastening devices and method can be used. Metal Floor trusses 2489 may be placed between floor panels 2488. Sub-roof truss 2452 is secured between wall panels 2490 and the roof panels 2491 are placed atop sub-floor truss 2452. In the preferred embodiment, the roof panels 2491 and wall panels 2491 are secured to sub-roof truss 2450 by screws, however other fastening devices and method can be used. Additionally, in embodiments where there are multiple sub-floor trusses 2450 and/or sub-roof trusses 2452 are installed, the trusses may be aligned and prevented from twisting with hat channels 2454. Hat channels 2454 are preferably beams that are coupled to perpendicularly to each of the sub-roof trusses. One or more hat channels 2454 can be installed. In the preferred embodiment, hat channels 2454 coupled to the floor trusses 2450 preferably extend the entire length of the structure 1700 (as shown in FIG. 28), while the hat channels 2454 coupled to the roof trusses 2452 extend from the first roof truss to the last roof truss (as shown in FIG. 29).

Figure 25A:
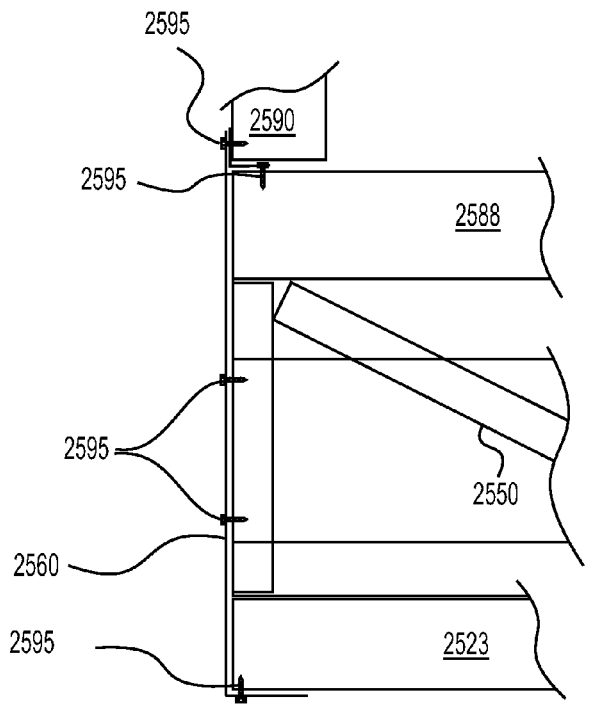
Figure 25B:
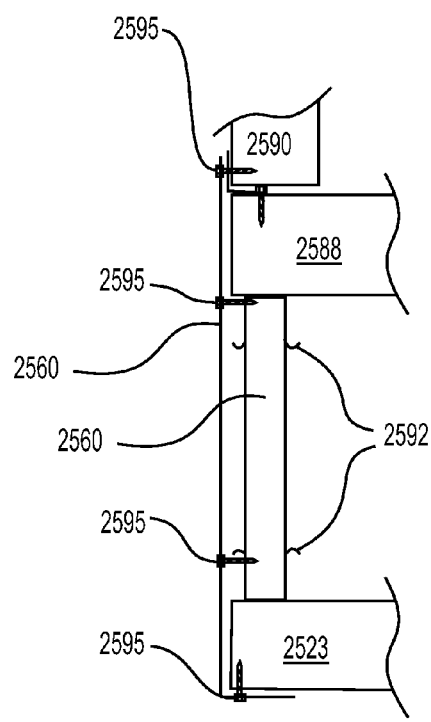

FIGS. 25a and 25b depict two views of an embodiment of a floor coupling device 2560. Preferably floor coupling device 2560 is a metal bracket (although other materials can be used) used to couple wall panels 2590, floor panels 2588, floor trusses 2550 and foundation panels 2523 to improve the stability of structure 1700. Preferably each element is coupled to floor coupling device 2560 with screws 2595 or other fastening devices or methods. Additionally, a second bracket can be installed to couple wall panels to floor panels. Floor coupling device 2560 can be placed at regular intervals along structure 1700, randomly, or can run the length of each wall. Preferably each wall has at least one floor coupling device 2560. Furthermore, as can be seen in FIG. 25b, portions 2590 of the floor trusses 2550 can be bent or curved to increase the strength of the materials.

Figure 26:

FIG. 26 depicts a view of an embodiment of the coupling of an interior wall C to roof and floor panels. In the preferred embodiment, an "L" shaped bracket is coupled (e.g. with screws, bolts, rivets, nails, adhesive, or another fastening device or method) to the floor panel and another "L" shaped bracket is coupled to the roof panel. The wall panel is then coupled to the two "L" shaped brackets, thereby installing the interior wall panel into structure 1700.

Figure 27A:
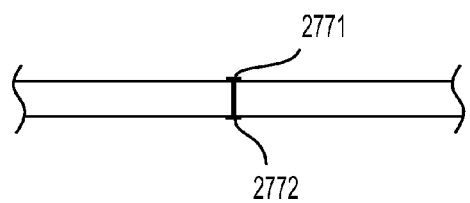
Figure 27B:
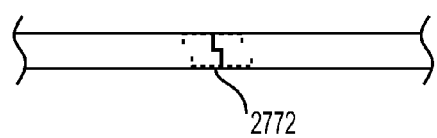

FIGS. 27A-B depict embodiments of devices to couple floor or roof panels together. The butt panel joint depicted in FIG. 27A is preferably comprised of two "T" shaped trim pieces. One trim piece preferably has a female end 2771 and one trim piece preferably has a male end 2772. The trim piece with the female end 2771 is preferably inserted between two adjoining panels. Then, the trim piece with the male end 2772 is inserted between the two adjoining panels and into the female end 2771, thereby joining the two trim pieces and securing the adjoining panels together. FIG. 27B, on the other hand, depicts a shiplap panel joint. The shiplap panel joint is similar to the butt panel joint except that the two adjoining wall panels have matching rabbets or grooves cut into the ends of the panels to aid in construction and provide extra support to the joints. The trim pieces are preferably made of metal, however other materials can be used.

Figure 30:
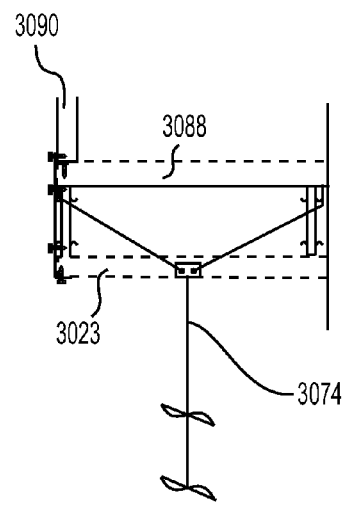

FIG. 30 depicts an embodiment of a structure tie-down 3074. In the preferred embodiment, at least one tie-down is used to secure structure 1700 to the ground. Preferably, the tie-downs are coupled to the foundation panels 3023, which are coupled to the sub-floor trusses 3050. The tie-down preferably are able to penetrate the ground by being screwed into the ground. However other methods of securing the tie-downs into the ground can be used, depending on the composition of the ground. Preferably, the tie-downs prevent structure 1700 from moving due to natural (e.g. earth quakes or floods) or unnatural occurrences (e.g. explosions or accidents).

Figure 31:
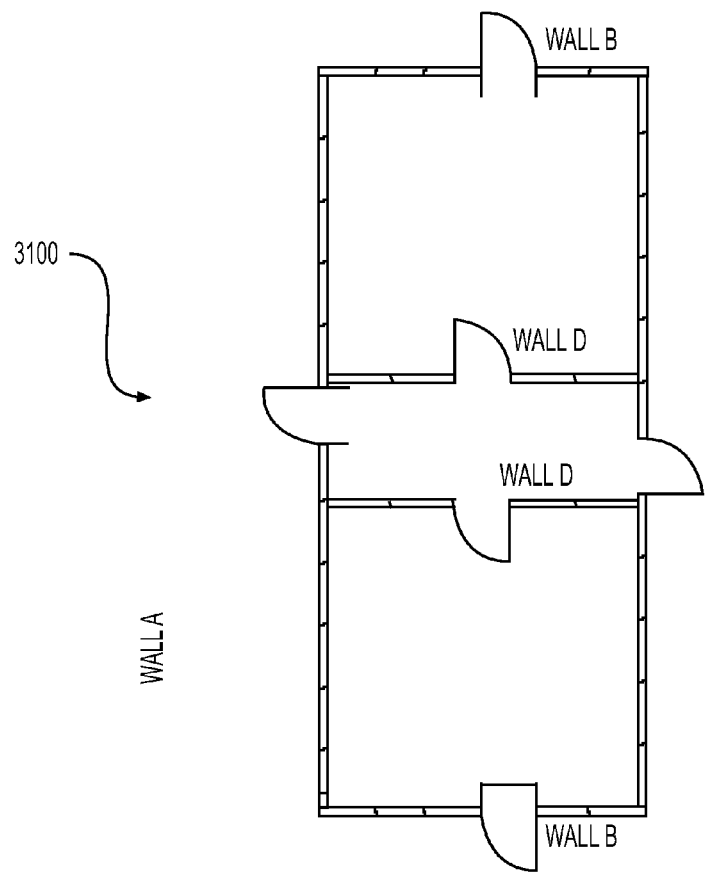
FIGS. 31-39 depict different views of another embodiment of a one storey relocatable structure.
Figure 32:
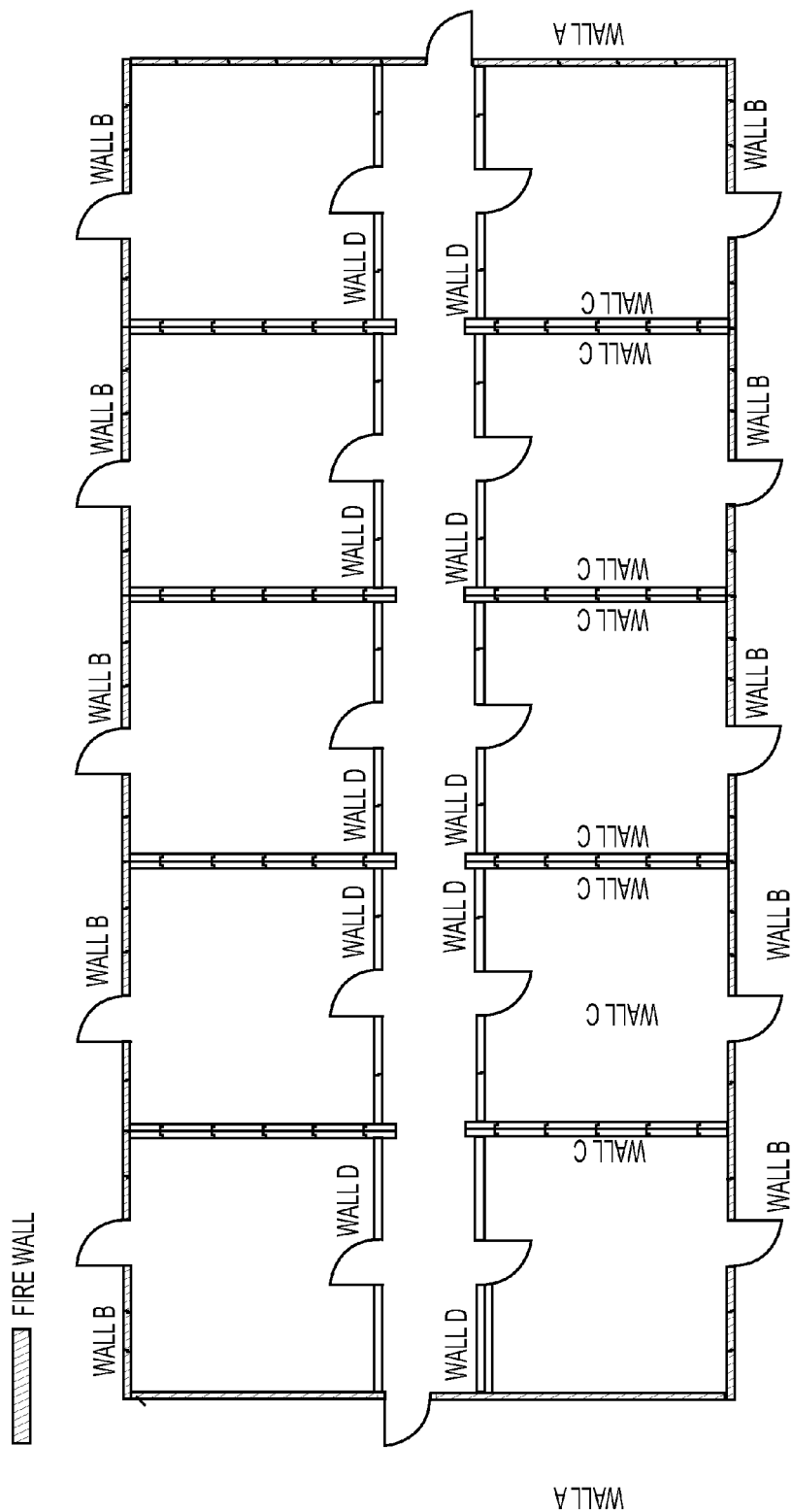

FIGS. 31-39 depict another embodiment of a relocatable structure 3100. FIG. 31 depicts a general floor plan of relocatable structure 3100. Relocatable structure 3100 is similar to structure 1700, with a different interior configuration. As can be seen in FIG. 17, structure 1700 has staggered interior door openings while, as can be seen in FIG. 31, structure 3100 has interior door openings that are across from each other. FIG. 32 depicts another floor plan similar to the floor plan depicted in FIG. 31, however the structure in FIG. 32 contains 10 rooms while the structure depicted in FIG. 31 has two rooms. The structure can be extended to more than 10 rooms or shortened to less than 10 rooms depending on the required use. Moreover, not all rooms need be of the same dimensions.

Figures 33A, 33B:
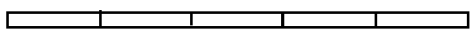

FIGS. 33A-B depict the general layout of the floor and roof panels 10. In the preferred embodiment, both the floor and roof layouts are identical. Each preferably uses panels as described herein. The number of panels used and the orientation of the panels may differ depending on the dimensions of structure 3100. In a preferred embodiment, each panel may have pre-drilled holes to facilitate installation of the panels.

Figure 35:
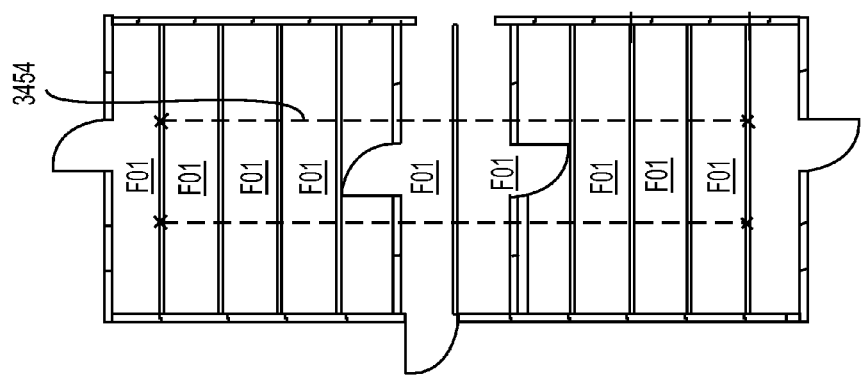
Figure 34:
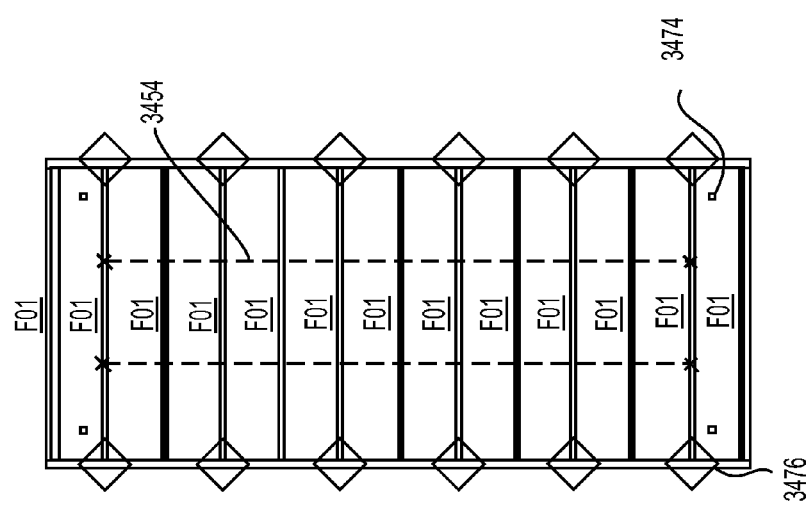
Figure 36:
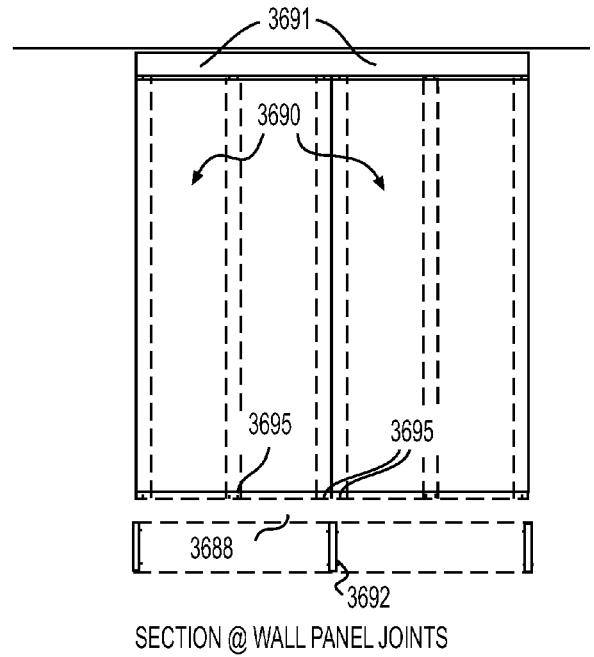
Figure 37:
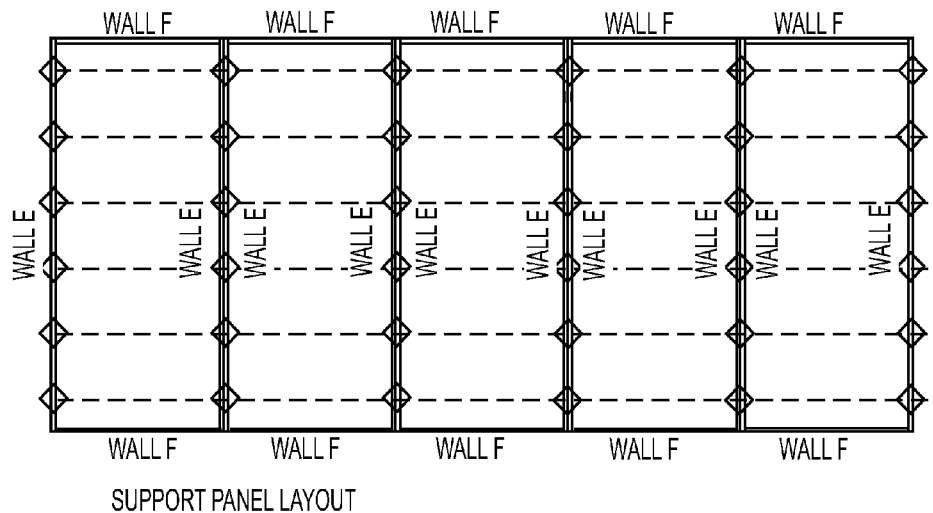

FIGS. 34 and 35 display the support trusses used to support the floor and roof panels, respectively. As can be seen in FIGS. 34 and 35, hat channels 3454 are attached to the structure to provide additional support. FIG. 36 depicts a section of wall, showing the joining of the wall panels 3690 to the floor 3688 and roof panels 3691. Preferably, the wall panels are coupled to the floor and roof panels with screws 3695. However, other fastening devices can be utilized. FIG. 37 depicts the support panel layout of the embodiment of the structure depicted in FIG. 32.

Figure 39:
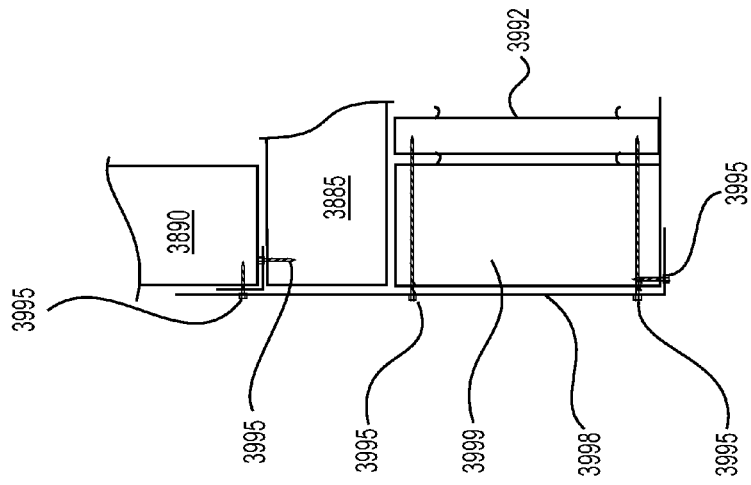
Figure 38:
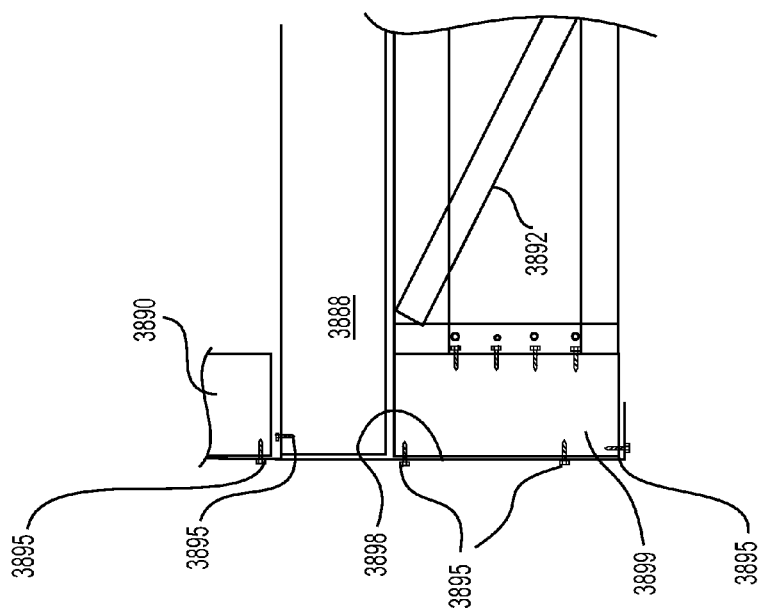

FIGS. 38 and 39 depict close-up views of two embodiments of the wall-floor-support truss connection. FIG. 38 depicts the connection to the end of the truss 3892, while FIG. 39 depicts the connection to the side of the truss 3992. In the embodiment shown in FIG. 38, preferably, a support panel 3899 is provided at the end of the floor truss 3892 and below the floor panel 3888. Likewise, in the embodiment shown in FIG. 39, a skirt panel 3999 is provided along the floor truss 3992 and below the floor panel 3885. Preferably, the floor panels are installed prior to the wall panels being installed. In both connections, preferably a coupling device 3898 and 3998 is used to secure the truss, floor panels, wall panels, support panels and/or skirt panels together. Preferably, the coupling device 3898 and 3998 is secured to the various panels with screws 3895 and 3995, however other fastening devices can be used.

Figure 40:
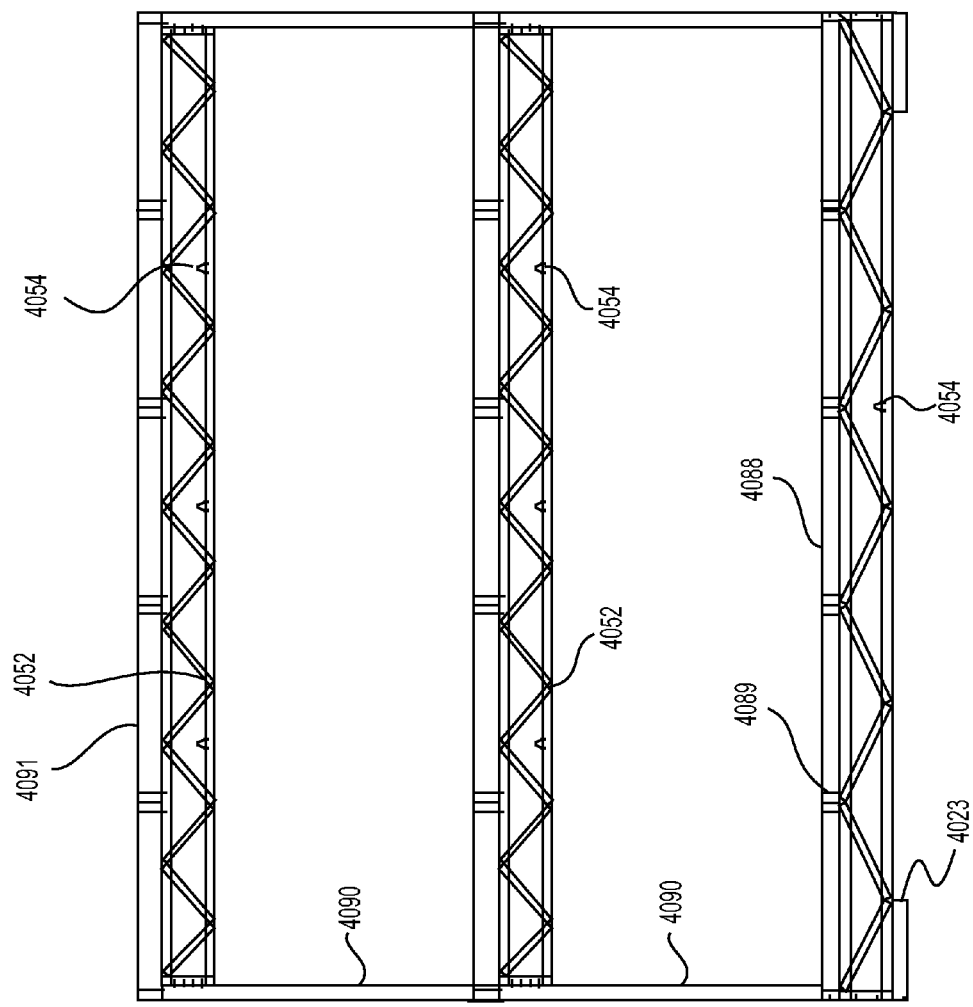
FIG. 40 depicts a view of an embodiment of a two story relocatable structure.

FIG. 40 depicts an embodiment of a two story relocatable structure 4000. Preferably structure 4000 is identical to the one story structures except that a second level is placed atop the first level. Since the roof panels and floor panels are preferably identical, the roof panels of structures 1700 and 3100 become the second story's floor panels of structure 4000. Another set of wall panels, roof panels, and sub-roof trusses is added to create the second story. More than two stories can be added (or ganged) to structure 4000 and additional levels can be added over portions of the structure while the remaining portions are a single story.

FIG. 41A-D depict another embodiment of a two story relocatable structure 4100. Structure 4100 is depicted as two stories high and multiple sub-structures long (for example structures 1700 or 3100 can be the sub-structures of structure 4100). Preferably, structure 4100 rests on an adjustable support bracket 4176 (for example as shown in FIGS. 42A-C). The adjustable support bracket 4176 is preferably able to adjust in height so that the supported structure is level even on unlevel ground. Preferably, there is one adjustable support bracket at every corner of the structure or sub-structures, however more or fewer adjustable support brackets can be installed.

Figure 41A:
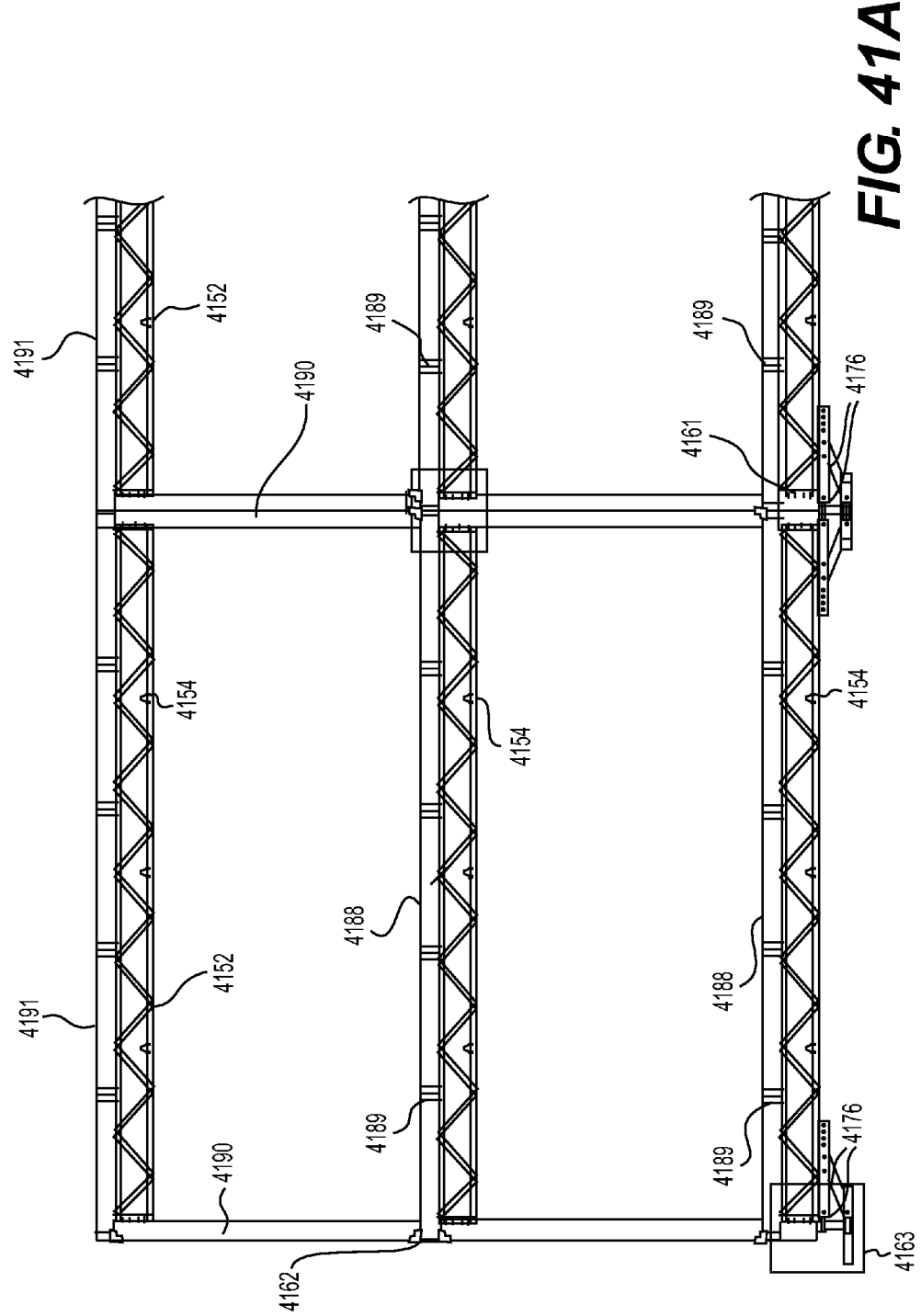
FIGS. 41A-D depict views of another embodiment of a two story relocatable structure.
Figure 41B:
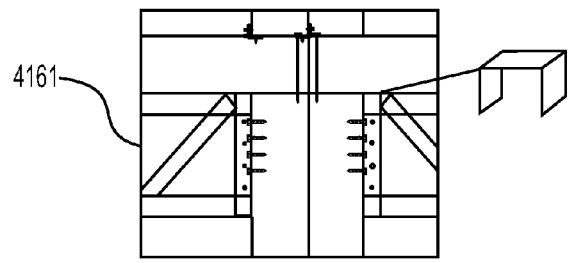
Figure 41C:
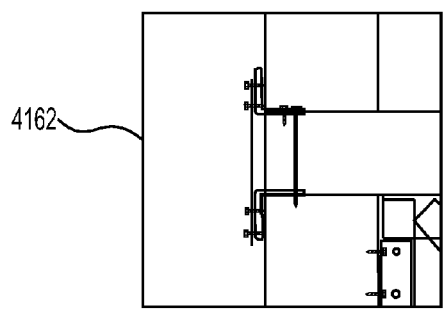
Figure 41D:
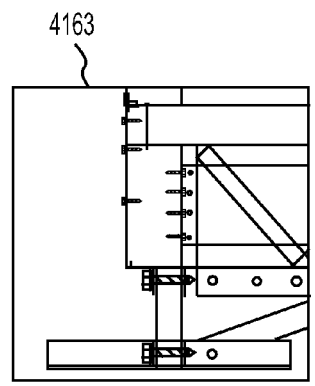

FIG. 41B depicts a coupling between two adjacent substructures using a building joint connector 4161. FIG. 41C depicts a level coupling bracket 4162 coupling two floors at the exterior walls. FIG. 41D depicts a coupling 4163 between the floor and an adjustable support bracket. Each of the couplings preferably use screws, however other fastening devices can be implemented.

Other embodiments and uses of the invention will be apparent to those skilled in the art from consideration of the specification and practice of the invention disclosed herein. All references cited herein, including all publications, U.S. and foreign patents and patent applications, are specifically and entirely incorporated by reference. It is intended that the specification and examples be considered exemplary only with the true scope and spirit of the invention indicated by the following claims. Furthermore, the term "comprising" includes the terms "consisting of" and "consisting essentially of," and the terms comprising, including, and containing are not intended to be limiting.

The invention claimed is:

1. A system for constructing a reassemblable structure, comprising:
    a plurality of wall panels;
    a plurality of roof panels;
    a plurality of floor panels;
    at least one readjustable support device, adapted to be adjusted to multiple positions;
    at least one skirt panel coupled below at least one floor panel and supported by the at least one readjustable support device;
    at least one sub-floor truss supporting the plurality of floor panels and coupled to the at least one skirt panel;
    at least one sub-roof truss coupled to an interior surface of at least two wall panels and supporting the plurality of roof panels; and
    at least one floor coupling bracket, the at least one floor coupling bracket securing an outer surface of one of the plurality of wall panels, to one of the plurality of floor panels, and to the at least one skirt panel.

2. The system of claim 1, further comprising at least one tie-down coupled to the reassemblable structure.

3. The system of claim 1, wherein the wall panels, the roof panels, and the floor panels are identical.

4. The system of claim 3, wherein each panel is comprised of a core, at least one reinforcing metal stud, and a metal skin having a coating on at least one surface of the core.

5. The system of claim 4, wherein the core is insulated and fire retardant.

6. The system of claim 1, wherein the system is adapted to be assembled and disassembled into original components on location, the original components are adapted to be moved to a second location, and the structure is adapted to be reassembled from the original components at the second location.

7. The system of claim 6, wherein the system is adapted to be re-located and reassembled after being disassembled multiple times.

8. The system of claim 1, further comprising at least one of screws, adhesive, rivets, bolts, or nails to adjoin panels.

9. The system of claim 1, wherein the reassemblable structure is a multi-story structure.

10. The system of claim 9, wherein the roof panels of the first story are the floor panels of the second story.

11. The system of claim 9, further comprising level coupling brackets coupling an outer surface of at least one wall panel of a lower level to an outer surface of at least one wall panel of an upper level.

12. The system of claim 1, further comprising at least one entranceway panel.

13. The system of claim 1, further comprising interior wall panels, wherein the interior wall panels divide the reassemblable structure into a plurality of rooms.

14. The system of claim 1, wherein adjacent panels are coupled together with shiplap joints or butt joints.

15. The system of claim 1, further comprising a foundation panel below the at least one sub-floor truss.

16. The system of claim 1, wherein the entire system is arrangeable within a single shipping container.

17. The system of claim 1, wherein at least a portion of the panels are predrilled to accept a screw.

18. The system of claim 1, wherein multiple reassemblable structures are arranged side-by-side to create a larger structure.

19. The system of claim 1, further comprising:
a first interlocking track coupled to a first edge of each wall panel, each roof panel, and each floor panel, wherein each first interlocking track comprises an angled recessed portion along an outer edge;
a second interlocking track coupled to a second, parallel edge, of each wall panel, each roof panel, and each floor panel, wherein the second interlocking track comprises an angled hemmed tab along a first outer edge adapted to mate with the angled recessed portion of the first interlocking track and a straight hemmed tab along a second, parallel outer edge; and
at least one coupling bracket, the at least one coupling bracket coupling one of the plurality of wall panels, to one of the plurality of floor panels wherein, each floor coupling bracket is adapted to mate with the angled recessed portion of the first interlocking track and be coupled to the straight hemmed tab of the second interlocking track.

20. The system of claim 1, wherein each floor coupling bracket is coupled to an outer surface of the structure.

* * * * *